(12) United States Patent
Styles et al.

(10) Patent No.: US 9,416,740 B2
(45) Date of Patent: *Aug. 16, 2016

(54) METHOD FOR ESTIMATING CHARGE AIR COOLER CONDENSATION STORAGE WITH AN INTAKE OXYGEN SENSOR WHILE EXHAUST GAS RECIRCULATION IS FLOWING

(71) Applicant: Ford Global Technologies, LLC, Dearborn, MI (US)

(72) Inventors: Daniel Joseph Styles, Canton, MI (US); Gopichandra Surnilla, West Bloomfield, MI (US); James Alfred Hilditch, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 269 days.

This patent is subject to a terminal disclaimer.

(21) Appl. No.: 14/192,765

(22) Filed: Feb. 27, 2014

(65) Prior Publication Data

US 2015/0240730 A1 Aug. 27, 2015

(51) Int. Cl.
*F02D 41/00* (2006.01)
*F02D 41/14* (2006.01)
*F02B 29/04* (2006.01)

(52) U.S. Cl.
CPC ........ *F02D 41/0007* (2013.01); *F02B 29/0468* (2013.01); *F02D 41/144* (2013.01); *F02D 41/0025* (2013.01); *F02D 2041/0075* (2013.01); *F02D 2200/0418* (2013.01); *Y02T 10/144* (2013.01)

(58) Field of Classification Search
CPC ...... F02B 29/04; F02B 29/0468; F02D 43/04; Y02T 10/114
USPC .................. 123/393, 350, 563; 701/108, 109; 60/605.1, 605.2
See application file for complete search history.

(56) References Cited

U.S. PATENT DOCUMENTS

| | | | |
|---|---|---|---|
| 2011/0094219 A1* | 4/2011 | Palm .................... | F02B 29/0468 60/599 |
| 2011/0155112 A1* | 6/2011 | Schiestl .............. | F02B 29/0418 123/672 |
| 2013/0298883 A1* | 11/2013 | Archer ............... | B60H 1/00271 123/568.12 |
| 2014/0075976 A1* | 3/2014 | Glugla ................ | F02B 29/0418 62/150 |
| 2014/0100762 A1 | 4/2014 | VanDerWege et al. | |

(Continued)

OTHER PUBLICATIONS

Surnilla, Gopichandra et al., "Method for Estimating Charge Air Cooler Condensation Storage and/or Release With an Intake Oxygen Sensor," U.S. Appl. No. 13/967,968, filed Aug. 15, 2013, 57 pages.

(Continued)

*Primary Examiner* — John Kwon
*Assistant Examiner* — Johnny H Hoang
(74) *Attorney, Agent, or Firm* — Julia Voutyras; Alleman Hall McCoy Russell & Tuttle LLP (57) ABSTRACT

Methods and systems are provided for estimating water storage in a charge air cooler (CAC). In one example, an amount of water accumulating in the CAC may be based on an output of an oxygen sensor positioned downstream of the CAC, ambient humidity, and EGR flow while EGR is flowing. Additionally, engine actuators may be adjusted to purge condensate from the CAC and/or reduce condensate formation based on the amount of water inside the CAC.

20 Claims, 4 Drawing Sheets

(56) References Cited

U.S. PATENT DOCUMENTS

| | | | |
|---|---|---|---|
| 2014/0109568 A1* | 4/2014 | Glugla | F02P 5/045 |
| | | | 60/599 |
| 2014/0109846 A1* | 4/2014 | Styles | F01P 7/04 |
| | | | 123/41.12 |
| 2014/0109880 A1* | 4/2014 | Styles | F02B 29/04 |
| | | | 123/542 |
| 2014/0110488 A1 | 4/2014 | Surnilla et al. | |
| 2015/0121864 A1* | 5/2015 | Surnilla | F02D 41/0052 |
| | | | 60/605.2 |

OTHER PUBLICATIONS

Rollinger, John E. et al., "Method for Estimating Charge Air Cooler Condensation Storage and/or Release With Two Intake Oxygen Sensors," U.S. Appl. No. 13/967,943, filed Aug. 15, 2013, 58 pages.

Surnilla, Gopichandra et al., "Method for Estimating Charge Air Cooler Condensation Storage With an Intake Oxygen Sensor," U.S. Appl. No. 14/065,147, filed Oct. 28, 2013, 39 pages.

Surnilla, Gopichandra et al., "Determining Exhaust Gas Recirculation Cooler Fouling Using DPOV Sensor," U.S. Appl. No. 14/075,787, filed Nov. 8, 2013, 48 pages.

* cited by examiner

METHOD FOR ESTIMATING CHARGE AIR COOLER CONDENSATION STORAGE WITH AN INTAKE OXYGEN SENSOR WHILE EXHAUST GAS RECIRCULATION IS FLOWING

BACKGROUND/SUMMARY

Turbocharged and supercharged engines may be configured to compress ambient air entering the engine in order to increase power. Compression of the air may cause an increase in air temperature, thus, an intercooler or charge air cooler (CAC) may be utilized to cool the heated air thereby increasing its density and further increasing the potential power of the engine. Condensate may form in the CAC when the ambient air temperature decreases, or during humid or rainy weather conditions, where the intake air is cooled below the water dew point. Low pressure exhaust gas recirculation (EGR) can further increase the condensate amount in the CAC by increasing water vapor concentrations and hence, increasing the temperatures at which condensation can occur. Condensate may collect at the bottom of the CAC, or in the internal passages, and cooling turbulators. Under certain air flow conditions, condensate may exit the CAC and enter an intake manifold of the engine as water droplets. If too much condensate is ingested by the engine, engine misfire and/or combustion instability may occur.

Other attempts to address engine misfire due to condensate ingestion include avoiding condensate build-up. In one example, the cooling efficiency of the CAC may be decreased in order to reduce condensate formation. However, the inventors herein have recognized potential issues with such methods. Specifically, while some methods may reduce or slow condensate formation in the CAC, condensate may still build up over time. If this build-up cannot be stopped, ingestion of the condensate during acceleration may cause engine misfire. Additionally, in another example, engine actuators may be adjusted to increase combustion stability during condensate ingestion. In one example, the condensate ingestion may be based on a mass air flow rate and amount of condensate in the CAC; however, these parameters may not accurately reflect the amount of water in the charge air exiting the CAC and entering the intake manifold. As a result, engine misfire and/or unstable combustion may still occur. Further still, some systems for estimating water accumulation within the CAC may only be accurate when EGR is off (e.g., not flowing) since EGR may introduce additional moisture into the charge air.

In one example, the issues described above may be addressed by a method for adjusting engine actuators based on water storage at a charge air cooler (CAC), the water storage based on an output of an oxygen sensor positioned downstream of the CAC, ambient humidity, and exhaust gas recirculation (EGR) flow. Specifically, the oxygen sensor may be positioned at an outlet of the CAC. An engine controller may use the output of the oxygen sensor to determine water content of the charge air exiting the CAC. The water content of the charge air entering the CAC may be estimated by ambient humidity plus water content of EGR (e.g., low-pressure EGR) entering an intake passage upstream of the CAC. The water content of the EGR may be based on the amount of water vapor in the exhaust gases and the amount of exhaust gases flowing into the intake passage (e.g., the EGR flow). The EGR flow may be determined from an EGR flow measurement sensor (such as a DPOV sensor) positioned in the EGR passage. In one example, the ambient humidity may be measured by a humidity sensor positioned upstream of the CAC and the EGR passage. The difference between the water content of the charge air entering the CAC and the water content of the charge air exiting the CAC may then be indicative of a water storage rate (e.g., water accumulation rate) within the CAC. The engine controller may then adjust engine operation to increase combustion stability, decrease condensate formation in the CAC, and/or evacuate condensate from the CAC in response to the determined water storage rate (or amount). As a result, condensate formation within the CAC may be reduced and engine misfire and combustion instability due to water ingestion may be decreased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
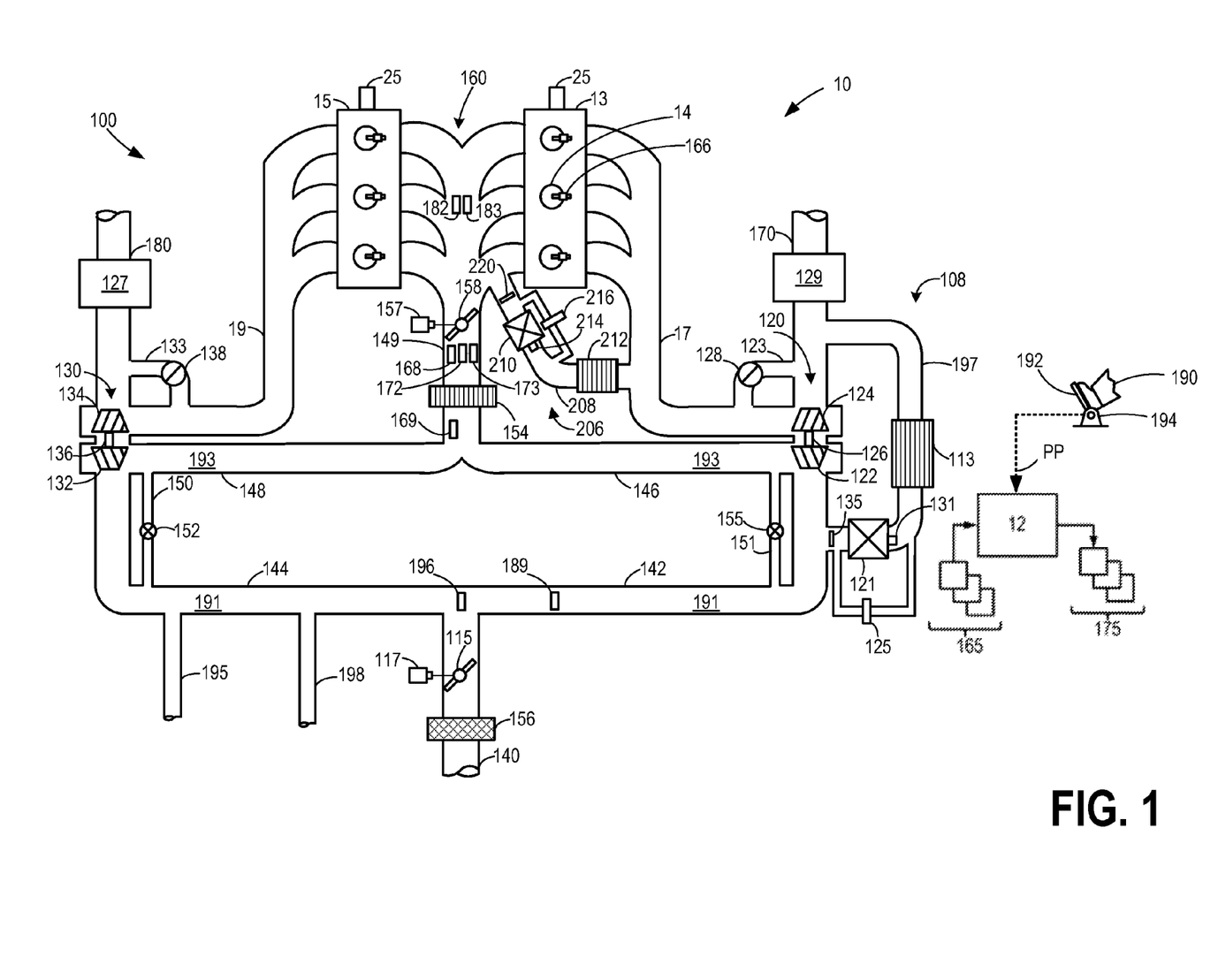
FIG. 1 is a schematic diagram of an example engine system including a charge air cooler.
Figure 2:
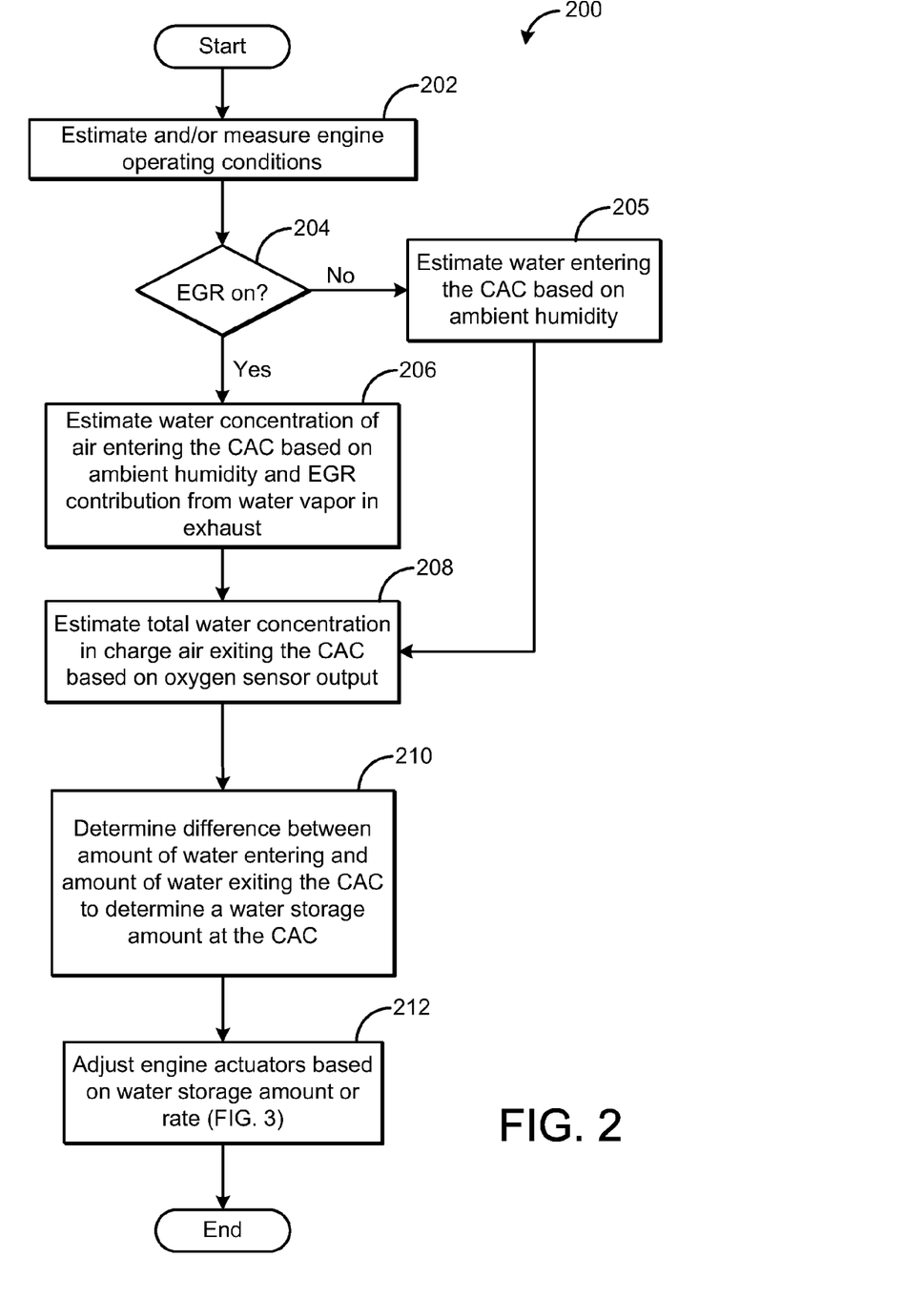
FIG. 2 is a flow chart of a method for estimating water storage at a charge air cooler based on EGR flow and an output of an intake oxygen sensor.
Figure 3:
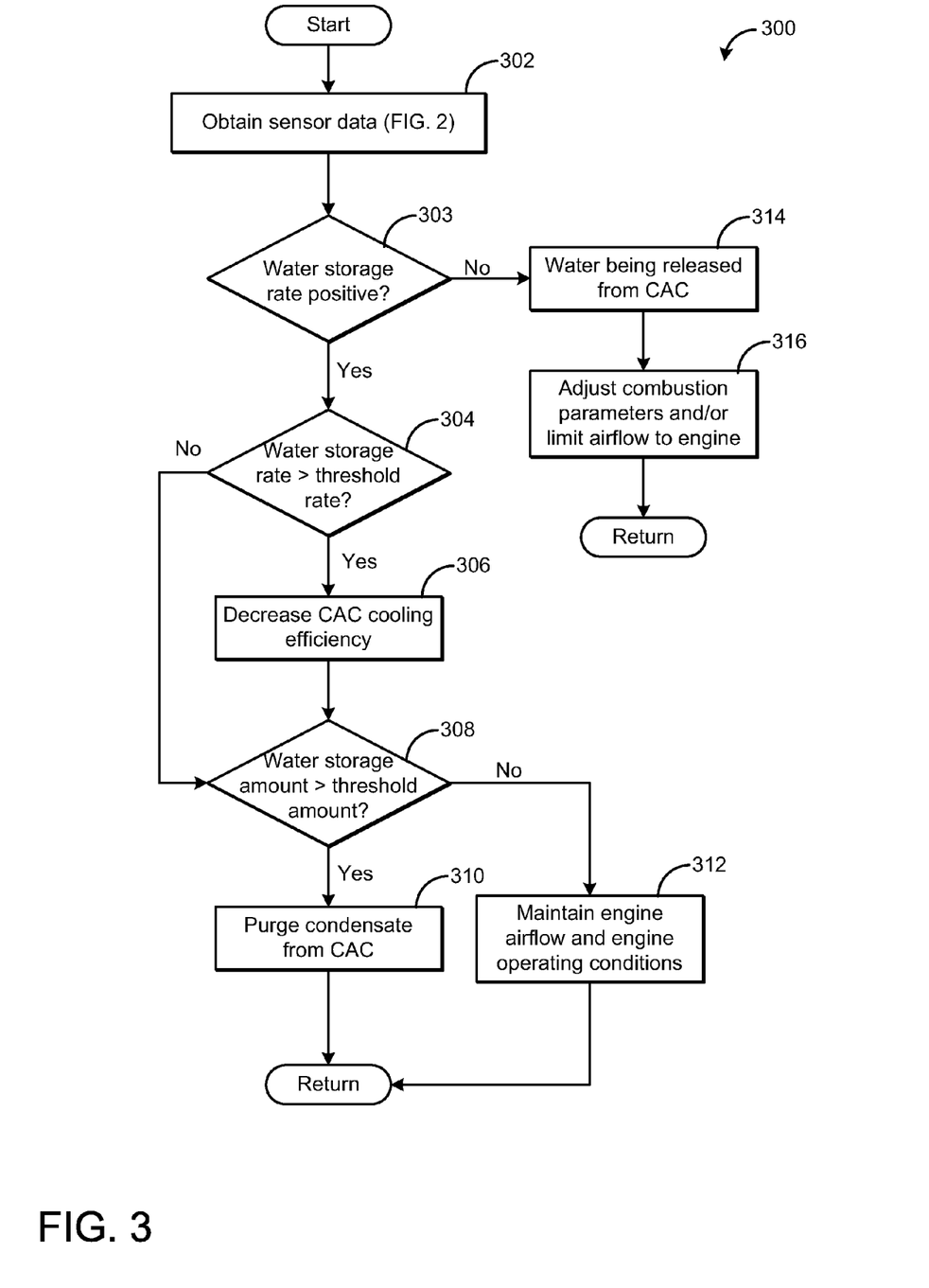
FIG. 3 is a flow chart of a method for adjusting engine operation based on water storage at a charge air cooler.
Figure 4:
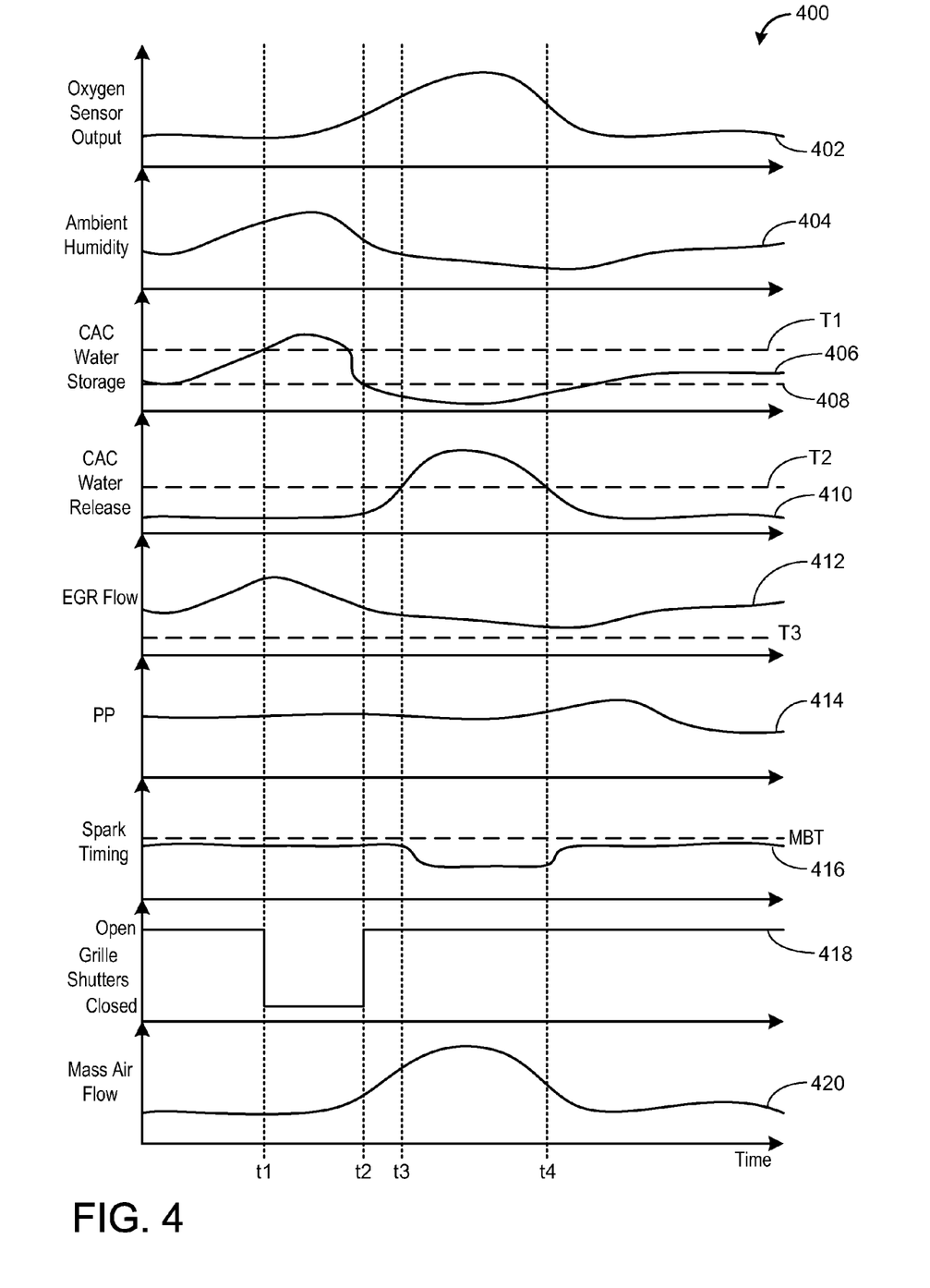
FIG. 4 show graphs illustrating example adjustments to engine operation based on water storage at a charge air cooler.

The following description relates to systems and methods for estimating water storage in a charge air cooler (CAC) in an engine system, such as the system of FIG. 1. An oxygen sensor may be positioned at an outlet of the CAC. The oxygen sensor may be used to determine an amount of water exiting the CAC. An amount of water entering the CAC may be estimated based on ambient humidity and EGR flow when EGR is flowing. For example, a low-pressure EGR system may introduce additional water into the engine intake system upstream of the CAC. As a result, as EGR flow increases, the amount of water in the charge air entering the CAC may increase. A method for determining a water accumulation rate (e.g., water storage rate or amount) in the CAC based on a difference between the amount of water entering and exiting the CAC is shown in FIG. 2. An engine controller may then adjust engine operation based on the water storage rate or amount, as shown at FIG. 3. Adjusting engine operation may include adjusting engine actuators to decrease a cooling efficiency of the CAC, purge condensate from the CAC, and/or increase combustion stability during ingestion of water by the engine. FIG. 4 shows example engine actuator adjustments based on water storage at the CAC. In this way, estimating water content in the charge air entering and exiting the CAC using an oxygen sensor, humidity sensor, and EGR flow sensor may allow for the determination of condensate storage in the CAC while EGR is flowing. Engine actuator adjustments based on condensate storage may then decrease condensate formation in the CAC, increase combustion stability during condensate purging from the CAC, and/or decrease water storage within the CAC.

FIG. 1 shows a schematic depiction of an example turbocharged engine system 100 including a multi-cylinder internal combustion engine 10 and twin turbochargers 120 and 130, which may be identical. As one non-limiting example, engine system 100 can be included as part of a propulsion system for a passenger vehicle. While not depicted herein, other engine configurations such as an engine with a single turbocharger may be used without departing from the scope of this disclosure.

Engine system 100 may be controlled at least partially by a controller 12 and by input from a vehicle operator 190 via an input device 192. In this example, input device 192 includes an accelerator pedal and a pedal position sensor 194 for generating a proportional pedal position signal PP. Controller 12 may be a microcomputer including the following: a microprocessor unit, input/output ports, an electronic storage medium for executable programs and calibration values (e.g., a read only memory chip), random access memory, keep alive memory, and a data bus. The storage medium read-only memory may be programmed with computer readable data representing non-transitory instructions executable by the microprocessor for performing the routines described herein as well as other variants that are anticipated but not specifically listed. Controller 12 may be configured to receive information from a plurality of sensors 165 and to send control signals to a plurality of actuators 175 (various examples of which are described herein). Other actuators, such as a variety of additional valves and throttles, may be coupled to various locations in engine system 100. Controller 12 may receive input data from the various sensors, process the input data, and trigger the actuators in response to the processed input data based on instruction or code programmed therein corresponding to one or more routines. Example control routines are described herein with regard to FIGS. 2-3.

Engine system 100 may receive intake air via intake passage 140. As shown at FIG. 1, intake passage 140 may include an air filter 156 and an air induction system (AIS) throttle 115. The position of AIS throttle 115 may be adjusted by the control system via a throttle actuator 117 communicatively coupled to controller 12.

At least a portion of the intake air may be directed to a compressor 122 of turbocharger 120 via a first branch of the intake passage 140 as indicated at 142 and at least a portion of the intake air may be directed to a compressor 132 of turbocharger 130 via a second branch of the intake passage 140 as indicated at 144. Accordingly, engine system 100 includes a low-pressure AIS system (LP AIS) 191 upstream of compressors 122 and 132, and a high-pressure AIS system (HP AIS) 193 downstream of compressors 122 and 132.

A positive crankcase ventilation (PCV) conduit 198 may couple a crankcase (not shown) to the second branch 144 of the intake passage such that gases in the crankcase may be vented in a controlled manner from the crankcase. Further, evaporative emissions from a fuel vapor canister (not shown) may be vented into the intake passage through a fuel vapor purge conduit 195 coupling the fuel vapor canister to the second branch 144 of the intake passage.

The first portion of the total intake air can be compressed via compressor 122 where it may be supplied to intake manifold 160 via intake air passage 146. Thus, intake passages 142 and 146 form a first branch of the engine's air intake system. Similarly, a second portion of the total intake air can be compressed via compressor 132 where it may be supplied to intake manifold 160 via intake air passage 148. Thus, intake passages 144 and 148 form a second branch of the engine's air intake system. As shown at FIG. 1, intake air from intake passages 146 and 148 can be recombined via a common intake passage 149 before reaching intake manifold 160, where the intake air may be provided to the engine. In some examples, intake manifold 160 may include an intake manifold pressure sensor 182 for estimating a manifold pressure (MAP) and/or an intake manifold temperature sensor 183 for estimating a manifold air temperature (MCT), each communicating with controller 12. In the depicted example, intake passage 149 also includes a charge air cooler (CAC) 154 and a throttle 158. The position of throttle 158 may be adjusted by the control system via a throttle actuator 157 communicatively coupled to controller 12. As shown, throttle 158 may be arranged in intake passage 149 downstream of CAC 154, and may be configured to adjust the flow of an intake gas stream entering engine 10.

As shown at FIG. 1, a compressor bypass valve (CBV) 152 may be arranged in CBV passage 150 and a CBV 155 may be arranged in CBV passage 151. In one example, CBVs 152 and 155 may be electronic pneumatic CBVs (EPCBVs). CBVs 152 and 155 may be controlled to enable release of pressure in the intake system when the engine is boosted. An upstream end of CBV passage 150 may be coupled with intake passage 148 downstream of compressor 132, and a downstream end of CBV passage 150 may be coupled with intake passage 144 upstream of compressor 132. Similarly, an upstream end of a CBV passage 151 may be coupled with intake passage 146 downstream of compressor 122, and a downstream end of CBV passage 151 may be coupled with intake passage 142 upstream of compressor 122. Depending on a position of each CBV, air compressed by the corresponding compressor may be recirculated into the intake passage upstream of the compressor (e.g., intake passage 144 for compressor 132 and intake passage 142 for compressor 122). For example, CBV 152 may open to recirculate compressed air upstream of compressor 132 and/or CBV 155 may open to recirculate compressed air upstream of compressor 122 to release pressure in the intake system during selected conditions to reduce the effects of compressor surge loading. CBVs 155 and 152 may be either actively or passively controlled by the control system.

As shown, a compressor inlet pressure (CIP) sensor 196 is arranged in the intake passage 142 and a HP AIS pressure sensor 169 is arranged in intake passage 149. However, in other anticipated embodiments, sensors 196 and 169 may be arranged at other locations within the LP AIS and HP AIS, respectively. Among other functions, CIP sensor 196 may be used to determine a pressure downstream of an EGR valve 121.

Engine 10 may include a plurality of cylinders 14. In the depicted example, engine 10 includes six cylinders arrange in a V-configuration. Specifically, the six cylinders are arranged on two banks 13 and 15, with each bank including three cylinders. In alternate examples, engine 10 can include two or more cylinders such as 3, 4, 5, 8, 10 or more cylinders. These various cylinders can be equally divided and arranged in alternate configurations, such as V, in-line, boxed, etc. Each cylinder 14 may be configured with a fuel injector 166. In the depicted example, fuel injector 166 is a direct in-cylinder injector. However, in other examples, fuel injector 166 can be configured as a port based fuel injector.

Intake air supplied to each cylinder 14 (herein, also referred to as combustion chamber 14) via common intake passage 149 may be used for fuel combustion and products of combustion may then be exhausted from via bank-specific exhaust passages. In the depicted example, a first bank 13 of cylinders of engine 10 can exhaust products of combustion via a common exhaust passage 17 and a second bank 15 of cylinders can exhaust products of combustion via a common exhaust passage 19.

The position of intake and exhaust valves of each cylinder 14 may be regulated via hydraulically actuated lifters coupled to valve pushrods, or via mechanical buckets in which cam lobes are used. In this example, at least the intake valves of each cylinder 14 may be controlled by cam actuation using a cam actuation system. Specifically, the intake valve cam actuation system 25 may include one or more cams and may utilize variable cam timing or lift for intake and/or exhaust valves. In alternative embodiments, the intake valves may be controlled by electric valve actuation. Similarly, the exhaust valves may be controlled by cam actuation systems or electric valve actuation. In still another alternative embodiment, the cams may not be adjustable.

Products of combustion that are exhausted by engine 10 via exhaust passage 17 can be directed through exhaust turbine 124 of turbocharger 120, which in turn can provide mechanical work to compressor 122 via shaft 126 in order to provide compression to the intake air. Alternatively, some or all of the exhaust gases flowing through exhaust passage 17 can bypass turbine 124 via turbine bypass passage 123 as controlled by wastegate 128. The position of wastegate 128 may be controlled by an actuator (not shown) as directed by controller 12. As one non-limiting example, controller 12 can adjust the position of the wastegate 128 via pneumatic actuator controlled by a solenoid valve. For example, the solenoid valve may receive a signal for facilitating the actuation of wastegate 128 via the pneumatic actuator based on the difference in air pressures between intake passage 142 arranged upstream of compressor 122 and intake passage 149 arranged downstream of compressor 122. In other examples, other suitable approaches other than a solenoid valve may be used for actuating wastegate 128.

Similarly, products of combustion that are exhausted by engine 10 via exhaust passage 19 can be directed through exhaust turbine 134 of turbocharger 130, which in turn can provide mechanical work to compressor 132 via shaft 136 in order to provide compression to intake air flowing through the second branch of the engine's intake system. Alternatively, some or all of the exhaust gases flowing through exhaust passage 19 can bypass turbine 134 via turbine bypass passage 133 as controlled by wastegate 138. The position of wastegate 138 may be controlled by an actuator (not shown) as directed by controller 12. As one non-limiting example, controller 12 can adjust the position of wastegate 138 via a solenoid valve controlling a pneumatic actuator. For example, the solenoid valve may receive a signal for facilitating the actuation of wastegate 138 via the pneumatic actuator based on the difference in air pressures between intake passage 144 arranged upstream of compressor 132 and intake passage 149 arranged downstream of compressor 132. In other examples, other suitable approaches other than a solenoid valve may be used for actuating wastegate 138.

In some examples, exhaust turbines 124 and 134 may be configured as variable geometry turbines, wherein controller 12 may adjust the position of the turbine impeller blades (or vanes) to vary the level of energy that is obtained from the exhaust gas flow and imparted to their respective compressor. Alternatively, exhaust turbines 124 and 134 may be configured as variable nozzle turbines, wherein controller 12 may adjust the position of the turbine nozzle to vary the level of energy that is obtained from the exhaust gas flow and imparted to their respective compressor. For example, the control system can be configured to independently vary the vane or nozzle position of the exhaust gas turbines 124 and 134 via respective actuators.

Products of combustion exhausted by the cylinders via exhaust passage 19 may be directed to the atmosphere via exhaust passage 180 downstream of turbine 134, while combustion products exhausted via exhaust passage 17 may be directed to the atmosphere via exhaust passage 170 downstream of turbine 124. Exhaust passages 170 and 180 may include one or more exhaust after-treatment devices, such as a catalyst, and one or more exhaust gas sensors. For example, as shown at FIG. 1, exhaust passage 170 may include an emission control device 129 arranged downstream of the turbine 124, and exhaust passage 180 may include an emission control device 127 arranged downstream of the turbine 134. Emission control devices 127 and 129 may be selective catalytic reduction (SCR) devices, three way catalysts (TWC), $NO_x$ traps, various other emission control devices, or combinations thereof. Further, in some embodiments, during operation of the engine 10, emission control devices 127 and 129 may be periodically regenerated by operating at least one cylinder of the engine within a particular air/fuel ratio, for example.

Engine system 100 may further include one or more exhaust gas recirculation (EGR) systems for recirculating at least a portion of exhaust gas from the exhaust manifold to the intake manifold. These may include one or more high-pressure EGR systems for proving high pressure EGR (HP EGR) and one or more low-pressure EGR-loops for providing low pressure EGR (LP EGR). In one example, HP EGR may be provided in the absence of boost provided by turbochargers 120, 130, while LP EGR may be provided in the presence of turbocharger boost and/or when exhaust gas temperature is above a threshold. In still other examples, both HP EGR and LP EGR may be provided simultaneously.

In the depicted example, engine system 100 may include a low-pressure (LP) EGR system 108. LP EGR system 108 routes a desired portion of exhaust gas from exhaust passage 170 to intake passage 142. In the depicted embodiment, EGR is routed in an EGR passage 197 from downstream of turbine 124 to intake passage 142 at a mixing point located upstream of compressor 122. The amount of EGR provided to intake passage 142 may be varied by the controller 12 via EGR valve 121 coupled in the LP EGR system 108. In the example embodiment shown at FIG. 1, LP EGR system 108 includes an EGR cooler 113 positioned upstream of EGR valve 121. EGR cooler 113 may reject heat from the recirculated exhaust gas to engine coolant, for example. The LP EGR system may include a differential pressure over valve (DPOV) sensor 125. In one example, an EGR flow rate may be estimated based on the DPOV system which includes the DPOV sensor 125 that detects a pressure difference between an upstream region of the EGR valve 121 and a downstream region of EGR valve 121. EGR flow rate (e.g., LP EGR flow rate) determined by the DPOV system may be further based on an EGR temperature detected by an EGR temperature sensor 135 located downstream of EGR valve 121 and an area of EGR valve opening detected by an EGR valve lift sensor 131. In another example, EGR flow rate may be determined based on outputs from an EGR measurement system that includes an intake oxygen sensor 168, mass air flow sensor (not shown), manifold absolute pressure (MAP) sensor 182 and manifold temperature sensor 183. In some examples, both the EGR measurement systems (that is, the DPOV system including differential pressure sensor 125 and the EGR measurement system including intake oxygen sensor 168) may be used to determine, monitor and adjust EGR flow rate. In alternate embodiments, the LP EGR system 108 may include an alternate type of sensor for measuring and/or estimating EGR flow (e.g., a differential pressure over orifice-type sensor, an EGR hot wire or hot film anemometer, etc.).

In an alternate embodiment, the engine system may include a second LP EGR system (not shown) that routes a desired portion of exhaust gas from exhaust passage 180 to intake passage 144. In another alternate embodiment, the engine system may include both the LP EGR systems (one routing exhaust gas from exhaust passage 180 to intake passage 144, and another routing exhaust gas from exhaust passage 170 to intake passage 142) described above.

In the depicted example, the engine system 100 may also include a HP EGR system 206. HP EGR system 206 routes a desired portion of exhaust gas from common exhaust passage 17, upstream of the turbine 124, to intake manifold 160, downstream of intake throttle 158. Alternatively, the HP EGR system 206 may be positioned between exhaust passage 17 and the intake passage 193, downstream of the compressor 122 and upstream of the CAC 154. The amount of HP EGR provided to intake manifold 160 may be varied by the controller 12 via EGR valve 210 coupled in the HP EGR passage 208. In the example embodiment shown at FIG. 1, HP EGR system 206 includes an EGR cooler 212 positioned upstream of EGR valve 210. EGR cooler 212 may reject heat from the recirculated exhaust gas to engine coolant, for example. The HP EGR system 206 includes a differential pressure over valve (DPOV) sensor 216. In one example, an EGR flow rate (e.g., HP EGR flow rate) may be estimated based on the DPOV system which includes the DPOV sensor 216 that detects a pressure difference between an upstream region of EGR valve 210 and a downstream region of EGR valve 210. EGR flow rate determined by the DPOV system may be further based on an EGR temperature detected by an EGR temperature sensor 220 located downstream of EGR valve 210 and an area of EGR valve opening detected by an EGR valve lift sensor 214. As explained above, in alternate embodiments, the HP EGR system 206 may include an alternate type of sensor for estimating EGR flow.

Likewise, the engine may include a second high-pressure EGR loop (not shown) for recirculating at least some exhaust gas from the exhaust passage 19, upstream of the turbine 134, to the intake passage 148, downstream of the compressor 132, or to the intake manifold 160, downstream of intake throttle 158. EGR flow through HP-EGR loops 208 may be controlled via HP-EGR valve 210.

EGR valve 121 and EGR valve 210 may be configured to adjust an amount and/or rate of exhaust gas diverted through the corresponding EGR passages to achieve a desired EGR dilution percentage of the intake charge entering the engine, where an intake charge with a higher EGR dilution percentage includes a higher proportion of recirculated exhaust gas to air than an intake charge with a lower EGR dilution percentage. In addition to the position of the EGR valves, it will be appreciated that AIS throttle position of the AIS throttle 115, and other actuators may also affect the EGR dilution percentage of the intake charge. As an example, AIS throttle position may increase the pressure drop over the LP EGR system, allowing more flow of LP EGR into the intake system. As a result, this may increase the EGR dilution percentage, whereas less LP EGR flow into the intake system may decrease the EGR dilution percentage (e.g., percentage EGR). Accordingly, EGR dilution of the intake charge may be controlled via control of one or more of EGR valve position and AIS throttle position among other parameters. Thus, adjusting one or more of the EGR valves 121 and 210 and/or the AIS throttle 115 may adjust and EGR flow amount (or rate) and subsequently a percentage EGR in the mass air flow (e.g., air charge entering the intake manifold).

The engine 10 may further include one or more oxygen sensors positioned in the common intake passage 149. As such, the one or more oxygen sensors may be referred to as intake oxygen sensors. In the depicted embodiment, an intake oxygen sensor 168 is positioned downstream of CAC 154. Specifically, in one example the intake oxygen sensor 168 may be positioned at the CAC outlet. However, in other embodiments, intake oxygen sensor 168 may be arranged at another location along intake passage 149. In some embodiments, an optional second oxygen sensor may be positioned in the intake manifold 160. Intake oxygen sensor (IAO2) 168 may be any suitable sensor for providing an indication of the oxygen concentration of the intake charge air (e.g., air flowing through the common intake passage 149), such as a linear oxygen sensor, intake UEGO (universal or wide-range exhaust gas oxygen) sensor, two-state oxygen sensor, etc. In one example, the intake oxygen sensors 168 may be an intake oxygen sensor including a heated element as the measuring element. During operation, a pumping current of the intake oxygen sensor may be indicative of an amount of oxygen in the gas flow.

In another example, the intake oxygen sensor 168 may be a variable voltage (variable Vs or VVs) intake oxygen sensor wherein a reference voltage of the sensor may be modulated between a lower or base voltage at which oxygen is detected and a higher voltage at which water molecules in the gas flow may be dissociated. For example, during base operation, the intake oxygen sensor may operate at the base reference voltage. At the base reference voltage, when water hits the sensor, the heated element of the sensor may evaporate the water and measure it as a local vapor or diluent. This operational mode may be referred to herein as the base mode. The intake oxygen sensor may also operate in a second mode wherein the reference voltage is increased to a second reference voltage. The second reference voltage may be higher than the base reference voltage. Operating the intake oxygen sensor at the second reference voltage may be referred to herein as variable Vs (VVs) mode. When the intake oxygen sensor operates in VVs mode, the heated element of the sensor dissociates water in the air and subsequently measures the water concentration. In this mode, the pumping current of the sensor may be indicative of an amount of oxygen in the gas flow plus an amount of oxygen from dissociated water molecules. However, if the reference voltage is further increased, additional molecules, such as $CO_2$, may also be dissociated and the oxygen from these molecules may also be measured by the sensor. In a non-limiting example, the lower, base reference voltage may be 450 mV and the higher, second reference voltage may be greater than 950 mV. However, in the method presented at FIG. 2 for determining an amount of water in the charge air, the second reference voltage may be maintained lower than a voltage at which $CO_2$ may also be dissociated. In this way, the second reference voltage may be set such that only oxygen from water (and not $CO_2$) may be measured in VVs mode.

The oxygen sensor 168 may be used to estimate condensate or water storage at the CAC 154. As discussed further below with reference to FIG. 2, the oxygen concentration in the air leaving the CAC 154 (e.g., determined by oxygen sensor 168) may be used to determine a concentration of water within the CAC 154. Various methods may be used to estimate water in the CAC 154. For example, the intake oxygen sensor 168 may measure an amount of oxygen in the charge air and then estimate an amount of water in the charge air using a dilution method. If the intake oxygen sensor is a VVs intake oxygen sensor, the sensor may estimate an amount of water in the charge air using a dissociation method (e.g., operating in VVs mode and modulating between a base reference voltage and a higher, second reference voltage). Both of these methods for measuring and/or estimating an amount of water in the charge air are discussed further below.

A first method for estimating water in the charge air using an intake oxygen sensor includes the dilution method. When using the dilution method, the intake oxygen sensor may be operated in the base mode at the base reference voltage. In one example, the base reference voltage may be 450 mV. In another example, the base reference voltage may be a voltage larger or smaller than 450 mV. The intake oxygen sensor may take a measurement and determine an amount of oxygen in the gas (e.g., intake or charge air) based on a pumping current of the sensor. Then, a comparison of the measured concentration of oxygen vs. the amount of oxygen in dry air may be used to determine the amount of water as a diluent in the charge air. The dilution method may give an inaccurate water estimate if the diluent includes substances other than water, such as EGR and/or fuel vapor.

A second method for estimating water in the charge air using an intake oxygen sensor includes the dissociation method. Specifically, for the dissociation method, a VVs intake oxygen sensor may operate in VVs mode wherein the reference voltage is increased from the base reference voltage to the higher, second reference voltage. In one example, the second reference voltage may be 950 mV. In another example, the second reference voltage may be a voltage greater than 950 mV. However, the second reference voltage may be maintained at a voltage lower than the voltage at which $CO_2$ is dissociated by the sensor. In VVs mode, the intake oxygen sensor dissociates the water into hydrogen and oxygen and measures the amount of oxygen from dissociated water molecules in addition to the amount of oxygen in the gas. By taking the difference between the measurements at the second reference voltage and the base reference voltage, an estimate of the total water concentration in the charge air may be determined. Additionally, at each temperature and pressure condition at the outlet of the CAC, a different amount of water condensate may be produced per unit of flow rate based on the saturation water vapor concentration. In one example, if the saturation water vapor concentration at the CAC outlet conditions is known (e.g., in a look-up table stored in the controller), the controller 12 may subtract this value from the total water concentration measured by the intake oxygen sensor to determine an amount water in the charge air in the form of water droplets. For example, the saturation water vapor concentration at the CAC outlet temperature and pressure conditions may result in a vapor concentration lower than the total water dilution measured by the IAO2 sensor, resulting in the some of the water exiting the CAC outlet in liquid form. In this way, the controller may determine an amount of liquid water in the charge air exiting the CAC from intake oxygen sensor measurements.

Additionally, in both methods (e.g., dilution and dissociation) of estimating water in the charge air exiting the CAC, the oxygen concentration measurement from the intake oxygen sensor (IAO2) (e.g., sensor output of first oxygen sensor 168) may be adjusted based on additional diluents in the charge air such as purge vapors (e.g., from fuel canister purge events), positive crankcase ventilation flow (PCV), or the like. In some embodiments, correction factors for purge and/or PCV flow may be pre-determined for different engine operating conditions. The correction factors may then be used to adjust the output of the IAO2 before estimating the water concentration. As a result, any decrease in oxygen concentration from purge or PCV flow may be corrected for with the correction factor. This may result in a more accurate water estimate.

Additionally, by taking a difference between an estimate of water entering the CAC and water exiting the CAC (determined by the output of the intake oxygen sensor 168), the amount of water stored (e.g., accumulating) within the CAC may be determined. The amount of water entering the CAC may be approximated by ambient humidity and an EGR contribution from water vapor in the exhaust (if EGR is flowing and entering the engine intake upstream of the CAC 154). In one example, ambient humidity may be measured with an ambient humidity sensor 189. As shown in FIG. 1, the humidity sensor 189 is positioned in the intake passage 142 (e.g., non PCV bank of the intake passage), upstream of the CAC 154 and an outlet of the LP EGR passage 197 into the intake passage 142 (e.g., junction between the LP EGR passage 197 and the intake passage 142 where LP EGR enters the intake passage 142). In an alternate example, ambient humidity may be estimated based on intake temperature, intake pressure, and/or a windshield wiper duty cycle. In yet another example, ambient humidity may be determined based on information from local weather stations or using the IAO2 sensor reading when EGR is not flowing and no impact of PCV or purge exists (e.g., during no PCV or purge flow). For example, the ambient humidity is determined as specified only when low-pressure EGR in not flowing and/or during conditions without any low pressure EGR flow.

The EGR contribution from water vapor in the exhaust may be estimated based on an EGR flow measurement (or estimate) and an estimate of the amount of water vapor in the exhaust (e.g., in the air flowing through the exhaust passage 170 from the engine). Specifically, an estimate of water vapor in the exhaust gas stream may be estimated based on combustion conditions of the engine, such as air-fuel ratio. In another example, an exhaust oxygen sensor may provide an estimate of water vapor content of the exhaust gas. EGR flow measured by the DPOV sensor (e.g., DPOV sensor 125) or another EGR flow measurement sensor may then be used to determine the amount of water vapor entering the intake passage 142 from the EGR passage (e.g., LP EGR passage 197). In this way, water vapor from LP EGR plus the measured ambient humidity may provide an estimate of the amount of water entering the CAC 154. In one example, only LP EGR flow may contribute to water vapor in the charge air entering the CAC 154. However, in embodiments wherein a HP EGR passage outlet (e.g., the outlet from the HP EGR passage and into the intake passage) is provided upstream of the CAC 154, the HP EGR contribution from water vapor in the exhaust may also contribute to the amount of water entering the CAC 154. In this embodiment, the amount of water entering the CAC 154 may be based on ambient humidity, LP EGR flow measurement, HP EGR flow measurement, and the estimate of water vapor in the exhaust gas.

In some examples the engine may not be flowing EGR (e.g., no LP or HP EGR flow). Thus, a water accumulation rate in the CAC may be determined from the difference between ambient humidity and the water concentration of the CAC outlet air as determined from the output of the oxygen sensor 168. Further, an amount of water within the CAC may be determined based on the water accumulation rate over a period of time. In some examples, estimating water inside the CAC in this way may only be performed when EGR is not flowing. Said another way, water estimates at the CAC based on ambient humidity and the output of the oxygen sensor 168 may only be accurate when EGR is turned off or below a threshold rate, the threshold rate based on an EGR flow rate that may not significantly change the oxygen sensor output.

Alternatively, if EGR is flowing, water accumulation in the CAC may be determined based on the difference between ambient humidity plus the EGR contribution of water vapor from the exhaust and the water concentration of the CAC outlet air as determined from the output of the oxygen sensor 168. Further, an amount of water within the CAC may be determined based on the water accumulation rate over a period of time. In this way, the amount of water accumulating or stored within the CAC may be determined while EGR (e.g., LP EGR) is flowing.

The controller 12 may use measurements at the oxygen sensor 168, measurements of the humidity sensor 189 (or estimated humidity value), measurements of EGR flow (e.g., LP EGR flow estimated from the DPOV sensor 125), and estimate of water content of the exhaust gas to determine a water storage rate and/or water storage amount in the CAC 154 (e.g., amount of water accumulated within the CAC 154).

In response to water storage estimates, the controller 12 may adjust engine actuators to adjust combustion parameters, activate condensate purging routines, and/or adjust actuators to increase or decrease CAC cooling efficiency. Engine actuator adjustments in response to water storage measurements from the oxygen sensors is presented in further detail below at FIG. 3.

Engine system 100 may include various sensors 165, in addition to those mentioned above. As shown in FIG. 1, common intake passage 149 may include a throttle inlet pressure (TIP) sensor 172 for estimating a throttle inlet pressure (TIP) and/or a throttle inlet temperature sensor 173 for estimating a throttle air temperature (TCT), each communicating with controller 12. Further, while not depicted herein, each of intake passages 142 and 144 can include a mass air flow sensor or alternatively the mass air flow sensor can be located in common duct 140.

The system of FIG. 1 provides for an engine system including an intake manifold, a charge air cooler positioned upstream of the intake manifold in an intake passage, an oxygen sensor positioned at an outlet of the charge air cooler; a low-pressure exhaust gas recirculation (EGR) passage coupled between an exhaust passage downstream of a turbine and the intake passage upstream of a compressor, the low-pressure EGR passage including a low-pressure EGR valve and low-pressure DPOV sensor for measuring low-pressure EGR flow, a humidity sensor positioned in the intake passage upstream of the low-pressure EGR passage, and a controller with computer readable instructions for adjusting engine operation responsive to a water storage rate at the charge air cooler, the water storage rate based on an output of the oxygen sensor, an output of the humidity sensor, and the measured low-pressure EGR flow when low-pressure EGR is flowing. The system may further comprise a high-pressure EGR system coupled between an exhaust passage upstream of the turbine and the intake passage downstream of the compressor and upstream of the CAC, the high-pressure EGR passage including a high-pressure EGR valve and high-pressure DPOV sensor for measuring high-pressure EGR flow. The water storage rate may be further based on the measured high-pressure EGR flow when high-pressure EGR is flowing.

FIG. 2 shows a method 200 for determining water storage at the CAC using an oxygen sensor, EGR flow measurement, and ambient humidity value. In one example, a water accumulation rate or amount within the CAC may be determined based on outputs from an intake oxygen sensor, an EGR flow measurement sensor (e.g., a DPOV sensor), and a humidity sensor. Specifically, the oxygen sensor may be an oxygen sensor positioned proximate to an outlet of the CAC. In one example, the method 200 is executable by the controller 12 shown in FIG. 1. The method 200 may be used in an engine system in which an oxygen sensor at the outlet of the CAC (such as the oxygen sensor 168 shown in FIG. 1), an EGR flow measurement sensor (such as DPOV sensor 125 shown in FIG. 1), and a humidity sensor (such as humidity sensor 189 shown in FIG. 1) are used to determine water storage parameters at the CAC. In one example, the oxygen sensor is a VVs oxygen sensor capable of modulating between two reference voltages. In another example, the oxygen sensor may not be a VVs sensor and may estimate water storage at the CAC using a dilution method. Further, the engine system may include a LP and/or a HP EGR system. If the HP EGR system ejects EGR into the intake passage upstream of the CAC, method 200 may use both LP and HP EGR flow measurements to determine an amount of water entering the CAC, as described further below.

The method begins at 202 by estimating and/or measuring engine operating conditions. Engine operating conditions may include engine speed and load, EGR flow rate (LP and/or HP), mass air flow rate, conditions of the charge air cooler (e.g., inlet and/or outlet temperature and pressures), ambient humidity, ambient temperature, torque demand, exhaust gas vapor content, air-fuel ratio, etc. At 204, the method includes determining if EGR is turned on (e.g., EGR is flowing). EGR may be turned on and flowing if an estimated and/or measured EGR flow is non-zero and/or an EGR valve is at least partially open. In one example, the method at 204 may include determining if LP EGR is flowing (e.g., a LP EGR valve is at least partially open). In another example, when the engine includes a HP EGR passage injecting EGR upstream of the CAC, the method at 204 may include determining if LP EGR and/or HP EGR is flowing (e.g., a LP EGR valve and/or a HP EGR are at least partially open). As discussed above, if EGR is flowing, additional water or water vapor may be entering the air flowing to the CAC and may therefore increase an amount of water entering the CAC. If EGR is not on and flowing, the method continues to 205 to estimate water entering the CAC (e.g., an amount of water entering the CAC) based on ambient humidity. For example, ambient humidity alone may estimate the amount of water vapor in the airflow entering the CAC since no additional water vapor is entering the airflow via one or more EGR passages. The ambient humidity may be estimated or measured. For example, the ambient humidity may be measured by a humidity sensor positioned in the intake passage upstream of the CAC. In this way, the humidity sensor may provide an estimate of the amount of water entering the CAC.

However, if EGR is turned on and flowing into the intake passage upstream of the CAC, the method continues on to 206 to estimate the water concentration of the air entering the CAC based on ambient humidity and the EGR contribution from water vapor in the exhaust. As discussed above, the water content (e.g., concentration or amount) of the exhaust gas flowing through the exhaust passage may be estimated based on combustion parameters (e.g., a combustion air-fuel ratio) and/or an output of an exhaust oxygen sensor. By scaling this water content estimate by the EGR flow estimate (or measurement), a controller may determine the water content of the EGR flowing into the intake passage upstream of the CAC. Thus, the EGR flow measurement and exhaust gas water vapor estimate may provide an estimate of the amount of water vapor entering the intake airflow. The EGR flow may be measured by an EGR flow measurement sensor. More specifically, the EGR flow may be a determined non-zero amount of EGR flow, the determined amount based on the output of the EGR flow measurement sensor while EGR is flowing at a desired EGR flow amount. The desired EGR flow amount may be determined based on operating conditions of the engine (such as engine speed and load, CAC condensate storage, etc.). Further, an EGR valve may be adjusted responsive to the determined non-zero amount of EGR flow and the desired EGR flow amount. In one example, the EGR flow measurement sensor may be a DPOV positioned in the LP and/or HP EGR passage. The water vapor contribution from EGR plus ambient humidity may then provide an estimate of the amount of water entering the CAC. In this way, the water concentration of the charge air entering the CAC may be based on outputs of one or more EGR flow measurement sensors and a humidity sensor. In alternate embodiments, ambient humidity may be estimated based on engine operating conditions such as intake temperature, intake pressure, and a windshield wiper duty cycle or weather data received from one or more of a weather station, remote device, or in-vehicle entertainment and communications system.

After determining the water concentration in the charge air entering the CAC, the method continues on to 208 to determine the total water concentration in the charge air exiting the CAC based on the output of the oxygen sensor positioned at the CAC outlet (e.g., positioned downstream from the CAC). In one example, the water concentration in the charge air may be estimated from the oxygen sensor output using the dilution method. As discussed above, the dilution method may include measuring the amount of oxygen in the charge air exiting the CAC outlet. Assuming the diluent in the charge air is water, the controller may determine the amount of water in the charge air based on the concentration of oxygen in air vs. the concentration of oxygen measured in the charge air (with the oxygen sensor positioned at the CAC outlet). Since the oxygen sensor may be positioned at the CAC outlet, the amount of water in the charge air may be an estimate of the water release amount from the CAC.

In another example, the water concentration in the charge air may be estimated from the oxygen sensor output using the dissociation method (if the oxygen sensor is a VVs oxygen sensor). As discussed above, the dissociation method may include increasing the reference voltage of the oxygen sensor from a base, first voltage to a second voltage. The method may further include determining a change in pumping current between the base reference voltage and the second reference voltage. As described above, the change in pumping current may be indicative of the amount of oxygen in the gas and the amount of oxygen dissociated from water molecules in the gas (e.g., charge air). The total water (e.g., condensate) concentration in the charge air (e.g., in the charge air at the CAC outlet) may then be determined based on the change in pumping current.

At 210, the method includes determining a difference between the amount of water entering the CAC and the amount of water exiting the CAC to determine a water storage amount at the CAC. Said another way, the difference between the water entering the CAC and the water exiting the CAC may be the water accumulation rate within the CAC. In this way, a water accumulation rate (e.g., water storage rate) within the CAC may be substantially equal to the difference between the ambient humidity plus the water vapor from EGR (based on the EGR flow rate and exhaust gas water content) and water concentration at the CAC outlet (e.g., the water measurement from the oxygen sensor at the CAC outlet). Then, the method at 210 may also include determining the amount of water accumulated in the CAC based on the water storage rate over a period of time.

If the difference between the water entering the CAC and water exiting the CAC is positive (e.g., ambient humidity plus EGR water content is greater than the water concentration at the CAC outlet), then water is being stored in the CAC. Alternatively, if the difference between the water entering the CAC and water exiting the CAC is negative (e.g., ambient humidity plus EGR water content is less than the water concentration at the CAC outlet), then water is being released from the CAC. In some examples, the method may also include estimating a water release amount and/or rate based on the output of the oxygen sensor at the CAC outlet, ambient humidity, and EGR flow (e.g., LP EGR flow and/or HP EGR flow if the EGR is entering the airflow upstream of the CAC). In this way, a negative water storage rate may indicate a positive water release rate from the CAC. The water release rate may be further based on a saturation water vapor concentration value for the CAC outlet temperature and pressure from the total water concentration. The saturation water vapor concentration values may include a mass of water in the saturation vapor condition based on the pressure and temperature conditions at the CAC outlet. In one example, the controller may determine the saturation water vapor concentration value from a look-up table of saturation water vapor concentration values at various CAC outlet temperatures and pressures stored in the controller.

At 212, the controller may adjust engine actuators based on the water storage rate or amount determined at 210. In some examples, the controller may additionally or alternatively adjust engine actuators based on the water release rate and/or amount from the CAC. In one example, the LP and/or HP EGR valve may be adjusted responsive to a determined non-zero amount of EGR flow (e.g., current EGR flow when EGR is flowing) and a desired EGR flow amount. The desired EGR flow amount may be determined in part based on the storage rate or amount determined at 210. A method for adjusting engine actuators responsive to water storage is presented at FIG. 3.

In this way, a method may include adjusting engine operation responsive to adjusting engine actuators based on water storage at a charge air cooler (CAC), the water storage rate based on an output of an oxygen sensor positioned downstream of the CAC, a humidity measurement, and an exhaust gas recirculation (EGR) flow measurement during a first condition when exhaust gas recirculation (EGR) is flowing and the water storage rate based on the output of the oxygen sensor and the humidity measurement during a second condition when EGR is not flowing. Said another way, when EGR is not flowing the water storage rate may be based on the output of the oxygen sensor and the humidity measurement and not on the EGR flow measurement. The water storage rate may be based on a difference between water entering the CAC and water exiting the CAC, the water entering the CAC based on the humidity measurement and the EGR flow measurement and the water exiting the CAC based on the output of the oxygen sensor. Additionally, the EGR flow measurement is one or more of low-pressure or high-pressure EGR where EGR is injected via an EGR outlet into an intake passage upstream of the CAC. The humidity measurement may measured by a humidity sensor positioned upstream of the CAC and upstream of the EGR outlet. In another example, the humidity may be estimated based on operating conditions. In this way, water storage at the CAC may be determined both when EGR is flowing and when EGR is not flowing into the intake passage upstream of the CAC.

Turning now to FIG. 3, a method 300 is shown for adjusting engine actuators and/or engine operation based on water storage (e.g., water accumulation rate) in the CAC. In one example, the method 300 is executable by the controller 12 shown in FIG. 1. Method 300 begins at 302 by obtaining sensor data from one or more oxygen sensors, EGR flow sensors, and/or intake air humidity sensors. The one or more oxygen sensors may include an oxygen sensor positioned proximate to the outlet of the CAC (e.g., oxygen sensor 168 shown in FIG. 1). For example, the method at 302 may include obtaining CAC water storage data or parameters determined in method 200, presented at FIG. 2. The water storage parameters may include one or more of a water storage rate (e.g., rate of water accumulating within the CAC) and/or a water storage amount (e.g., amount of water stored in the CAC). In some examples, the water storage parameters may further include a water release rate and/or amount.

At 303, the method includes determining if the water storage rate is positive. As described at FIG. 2, the water storage rate may be based on a difference between ambient humidity plus water from EGR entering the intake passage upstream of the CAC (e.g., water entering the CAC) and the water concentration at the CAC outlet (the amount of water exiting the CAC based on oxygen sensor output). If the water content of the charge air entering the CAC is greater than the water content of the charge air exiting the CAC outlet, then water is being stored in the CAC and the water storage rate is positive. Conversely, if the water content of the charge air entering the CAC is less than the water content of the charge air exiting the CAC outlet, then water is being released from the CAC and the water storage rate may be negative. Even though the water storage rate may be negative, the net amount of condensate within the CAC may still be greater than zero. In some examples wherein the water concentration at the CAC inlet is substantially equal to the water concentration at the CAC outlet, the water storage rate may be substantially zero such that no water is being released or stored within the CAC. The amount of water in the CAC may then be determined based on previous water storage rate data over a period of time.

If the water storage rate is negative at 303, the method continues on to 314 to indicate that water is being released from the CAC. In response to the negative water storage rate (e.g., ambient humidity plus EGR water content being less than the water concentration of the charge air at the CAC outlet), the method continues on to 316 to adjust combustion parameters and/or limit airflow to the engine. In one example, adjusting combustion parameters may include adjusting spark timing to increase combustion stability during the water ingestion (e.g., water release from CAC). For example, the controller may retard spark timing during a tip-in (e.g., pedal position greater than an upper threshold position) when the water release rate and/or water release amount are greater than their respective thresholds. In another example, the controller may advance spark timing if the pedal position is relatively constant, or below a threshold position, when the water release rate and/or water release amount are greater than their respective thresholds (e.g., during a condensate purging routine). The amount of spark retard or advance may be based on the water release rate and/or the water release amount. In other examples, additional or alternative combustion parameters may be adjusted during the water release conditions.

Alternatively at 303, if the water storage rate is positive, the method continues on to 304 to determine if the water storage rate (e.g., condensate storage rate or water accumulation rate in the CAC) is greater than a threshold rate. In one example, the threshold water storage rate may be based on a rate at which a threshold amount of condensate may accumulate in the CAC. The threshold amount of condensate (or water) may result in engine misfire or unstable combustion if blown out of the CAC at once and ingested by the engine. If the water storage rate is greater than the threshold rate, the method continues on to 306 to decrease cooling efficiency of the CAC. Decreasing cooling efficiency of the CAC may include one or more of closing or reducing an opening of vehicle grille shutters, turning off or reducing a speed of an engine cooling fan and/or dedicated CAC fan, and/or decreasing coolant pump speed of a coolant-cooled CAC coolant pump. Other engine actuator adjustments may also be made to decrease the cooling efficiency of the CAC, thereby reducing condensate formation. In one example, the controller may adjust the above engine actuators (e.g., fan, grille shutters, etc.) to increase the CAC temperature above a dew point temperature. Alternately or additionally, the EGR rate may be reduced to reduce the condensate formation. For example, if the system includes LP EGR, the method at 306 may include decreasing an opening of the LP EGR valve to reduce LP EGR flow. If the system additionally or alternatively includes a HP EGR passage coupled to the intake passage upstream of the CAC, the method at 306 may include decreasing an opening of the HP EGR valve to decrease the HP EGR flow.

After decreasing CAC cooling efficiency, the method continues on to 308 to determine if a water storage amount at the CAC is greater than a threshold amount. As discussed above, the water storage amount may be an amount of condensate or water stored (e.g., built-up) within the CAC. In one example, the threshold water storage amount may be based on an amount of water that may result in engine misfire and/or unstable combustion if blown out of the CAC and ingested by the engine all at once. If the water storage amount at the CAC is greater than the threshold amount, the method continues on to 310 to purge accumulated condensate from the CAC. At 310, the controller may activate various condensate purging routines to evacuate condensate from the CAC, based on engine operating conditions. For example, during a tip-in or other increase in engine airflow, the controller may limit an increase in engine airflow to controllably release condensate from the CAC and into the intake manifold of the engine. In another example, the controller may increase engine airflow, even if there is not an increased torque request, to purge condensate from the CAC. In one example, the controller may increase engine airflow by downshifting at transmission gear. In another example, increasing engine airflow may include increasing an opening of a throttle to increase mass air flow. In yet another example, the purge routine may include activating a condensate pump and a method for disposing of the condensate. The method at 310 may also include adjusting additional engine actuators such as spark timing, air-fuel ratio, etc. during the various condensate purging routines. Alternatively, if the water storage amount is not greater than the threshold amount at 308, the method may continue on to 312 to maintain engine airflow at a requested level and maintain engine operating conditions.

In this way, the controller may adjust engine actuators to reduce condensate formation at the CAC and/or increase combustion stability during water release from the CAC. The controller may base the engine actuator adjustments on water storage and/or water release (e.g., amount of water in the charge air exiting the CAC) parameters. Further, the controller may determine the CAC water storage and/or water release parameters based on output from an oxygen sensor positioned downstream from the CAC outlet (e.g., at the outlet of the CAC), an EGR flow measurement, and an ambient humidity measurement.

In addition to controlling CAC cooling efficiency and/or combustion parameters, output from the outlet CAC oxygen sensor may be used for various diagnostics. In one example, the controller may use oxygen sensor output to diagnose alternate models and/or estimates of CAC efficiency, CAC condensate, and/or CAC dew point. For example, a water storage rate (or amount) determined from the outlet CAC oxygen sensor, ambient humidity, and EGR flow measurement sensor may be compared to an expected water storage rate determined from one of the CAC condensate models. If the two water storage rate estimates are not within a threshold of one another, the controller may indicate an error in the condensate model. The controller may then make adjustments to the model to increase the accuracy.

In this way, an engine method comprises adjusting engine actuators based on water storage at a charge air cooler (CAC), the water storage based on an output of an oxygen sensor positioned downstream of the CAC, ambient humidity, and exhaust gas recirculation (EGR) flow. The EGR flow may be based on an output of an EGR flow sensor positioned in a low-pressure EGR passage, the low-pressure EGR passage positioned between an exhaust passage downstream from a turbine and an intake passage upstream of a compressor. In one example, the EGR flow sensor is a differential pressure over valve (DPOV) sensor. The EGR flow is estimated based on an output of the DPOV sensor, an EGR temperature, and an area of EGR valve opening detected by an EGR valve lift sensor.

More specifically, the EGR flow is a determined non-zero amount of EGR flow, the determined amount based on the output of the EGR flow sensor while EGR is flowing at a desired EGR flow amount. The desired EGR flow amount may be determined based on operating conditions of the engine. Further, an EGR valve may be adjusted responsive to the determined non-zero amount of EGR flow and the desired EGR flow amount.

The ambient humidity may be measured by a humidity sensor positioned in the intake passage upstream of the CAC and an outlet from the low-pressure EGR passage and into the intake passage. Further, the water storage is based on a difference between a water content of charge air entering the CAC and a water content of the charge air exiting the CAC, the water content of the charge air entering the CAC based on the ambient humidity and the EGR flow while EGR is flowing through the low-pressure EGR passage and the water content of the charge air exiting the CAC based on the output of the oxygen sensor.

The water storage is one of a water storage rate within the CAC or an amount of water stored within the CAC. In one example, adjusting engine actuators based on water storage includes adjusting one or more of vehicle grille shutters, engine cooling fans, or a charge air cooler coolant pump to decrease a cooling efficiency of the charge air cooler in response to the water storage rate increasing above a threshold rate. In another example, adjusting engine actuators based on water storage includes decreasing an opening of an EGR valve positioned in a low-pressure EGR passage responsive to the water storage rate increasing above the threshold rate. In yet another example, adjusting engine actuators based on water storage includes increasing engine airflow to purge condensate from the charge air cooler in response to the amount of water stored within the charge air cooler increasing above a threshold amount.

The oxygen sensor may be an intake oxygen sensor positioned at an outlet of the CAC. In an alternate embodiment, ambient humidity is estimated based on one or more of intake temperature, intake pressure, or a windshield wiper duty cycle. In yet another embodiment, ambient humidity is determined based on weather data received from one or more of a weather station, remote device, or in-vehicle entertainment and communications system.

FIG. 4 shows a graphical example of adjustments to engine operation based on water storage at the CAC. Specifically, graph 400 shows changes in an output of an oxygen sensor at plot 402, changes in humidity at plot 404, changes in CAC water storage based on the oxygen sensor output, EGR flow, and humidity at plot 406, changes in CAC water release at plot 410, changes in EGR flow at plot 412, changes in pedal position (PP) at plot 414, changes in spark timing at plot 416, changes in a position of vehicle grille shutters at plot 418, and changes is mass air flow at plot 420. The oxygen sensor may be positioned at an outlet of the CAC and referred to herein as the outlet oxygen sensor. Humidity may be ambient humidity and may either be measured with a humidity sensor or estimated based on ambient conditions (e.g., temperature, pressure and wiper or external weather data). If the ambient humidity is measured with a humidity sensor, the humidity sensor may be positioned in an intake passage, upstream of a LP EGR inlet (e.g., upstream of the junction between the LP EGR passage and the intake passage) and upstream of the CAC. The LP EGR inlet may also be referred to herein as an EGR outlet as EGR may be exiting the EGR passage and entering the intake passage. In some examples an additional oxygen sensor (different from the exhaust oxygen sensor) may be positioned in the intake (e.g., intake manifold) for estimating EGR flow. In another embodiment, EGR flow may be measured by an EGR flow measurement sensor positioned in the EGR passage. For example, EGR flow may be estimated by a DPOV sensor. In one example, the EGR flow is LP EGR flow. In another example, the EGR flow is HP EGR flow when the HP EGR outlet from the HP EGR passage and into the intake passage is upstream of the CAC. Additionally, if the outlet oxygen sensor is a VVs sensor, the outlet oxygen sensor may be modulated between a first reference voltage, V1, and a second reference voltage, V2. The first reference voltage may also be referred to as the base reference voltage. The water concentration at the outlet sensor may be based on the change in pumping current when switching between V1 and V2. In alternate embodiments, if the oxygen sensor is not a VVs sensor, the sensor may be maintained at a base reference voltage and the oxygen concentration at the CAC outlet may be determined using a dilution method.

Plot 406 shows changes in water storage in the CAC, the water storage based on the output from the outlet oxygen sensor, an ambient humidity measurement (or estimate), and an EGR flow measurement. The water storage shown at plot 406 may include an amount of water stored in the CAC or a rate of water storage in the CAC. Plot 410 shows water release from the CAC. The water release may be a water release amount or rate based off the water storage value (and thus based off the outlet oxygen sensor output, ambient humidity, and EGR flow rate). At plot 406, substantially zero water storage is shown at the zero line 408. Below the zero line 408, the water storage value is negative, thereby corresponding to a positive water release value, as shown at plot 410.

Prior to time t1, water storage in the CAC may be less than a threshold T1 (plot 406) and water release from the CAC may be less than a threshold T2 (plot 410). Additionally, the pedal position may be relatively constant (plot 414) and the grille shutters may be open (plot 418). Before time t1, ambient humidity (plot 404) and EGR flow (plot 412) may be increasing. In one example, the ambient humidity may be measured by a humidity sensor upstream of the CAC and the EGR system may flow the EGR into the intake passage upstream of the CAC. As discussed above, the amount of water vapor in the EGR flow may be based on the EGR flow rate and the water content of the exhaust gas. As EGR flow increases, the water vapor entering the intake airflow via the EGR system may increase. Thus, the humidity plus an amount of vapor in the EGR flow (based on EGR flow) may be an estimate of the amount of water in the charge air entering the CAC. Thus, increasing ambient humidity and increasing EGR flow may indicate an increasing amount of water in the charge air entering the CAC. As a result, the CAC water storage level may be increasing before time t1 (plot 406). In an alternate example, if the EGR flow rate were below a threshold T3 prior to time t1, the amount of water in the charge air entering the CAC may be based only on ambient humidity (e.g., the humidity sensor output) and not on EGR flow. In one example, the threshold T3 may be substantially zero such that the EGR is turned off. In another example, the threshold T3 may be a flow rate greater than zero but small enough that the EGR flow may not be contributing significantly to the amount of water in the charge air flow.

At time t1, the CAC water storage level increases above the threshold T1 (plot 406). In response, the controller may close the grille shutters (plot 418) to reduce condensate formation in the CAC. In alternate examples, the controller may adjust alternate or additional engine actuators to reduce condensate formation. For example, the controller may additionally or alternatively turn off an engine cooling fan at time t1. Additionally at time t1, the controller may decrease the opening of the EGR valve in order to decrease EGR flow (plot 412) and reduce condensate accumulation within the CAC.

Between time t1 and time t2 the CAC water storage level may decrease. At time t2, the CAC water storage may decrease below the threshold T1 and to a value of substantially zero (plot 406). In response, the controller may re-open the grille shutters (plot 418). In alternate embodiments, the grille shutters may remain closed at time t2. Also before time t2, mass air flow begins to increase. In one example, the controller may increase mass air flow based on engine operation. In another example, the controller may increase mass air flow to purge the stored condensate from the CAC. As the mass air flow increases, the outlet oxygen sensor output also increases (plot 402). This increase in output may indicate an increase in water in the charge air exiting the CAC. At time t2, the CAC water storage value becomes negative and CAC water release begins increasing between time t2 and time t3 (plot 410). At time t3, the CAC water release increases above threshold T2. In response, the controller retards spark timing from MBT (plot 416). The controller may retard spark timing rather than advancing spark timing since pedal position remains relatively constant at time t3. Retarding spark during the water release from the CAC may increase combustion stability as the engine ingests the released water (e.g., condensate). In an alternate example, the controller may advance spark timing instead of retarding spark timing at time t3. At time t4 the water release from the CAC decreases below the threshold T2 (plot 410). The controller then stops retarding spark (plot 416).

As shown in FIG. 4, an engine method includes adjusting engine actuators based on a water storage rate at a charge air cooler, the water storage rate based on an output of an oxygen sensor positioned at an outlet of the charge air cooler, an output of a humidity sensor positioned in an intake upstream of the charge air cooler, and an output of an EGR flow measurement sensor positioned in an EGR passage coupled to the intake upstream of the charge air cooler. As shown at time t3, in one example, adjusting engine actuators includes adjusting one or more of spark timing or mass air flow in response to the water storage rate being negative. Further, adjusting spark timing includes advancing spark timing when a pedal position is increasing and retarding spark timing when the pedal position is below a threshold position.

In another example, as shown at time t1, adjusting engine actuators includes adjusting one or more of vehicle grilles shutters, engine cooling fans, charge air cooler cooling fans, or a charge air cooler coolant pump to decrease cooling efficiency of the charge air cooler in response to the water storage rate increasing above a threshold rate (e.g., threshold T1). The method may further include estimating a water storage amount based on the water storage rate. In yet another example, adjusting engine actuators includes increasing engine airflow to purge water from the charge air cooler in response to the water storage amount increasing above a threshold amount.

In this way, an output from an oxygen sensor positioned proximate to a CAC outlet, an EGR flow measurement, and ambient humidity measurement may be used to determine water storage at the CAC. In one example, an oxygen sensor positioned at the outlet of the CAC may be used to determine water content of the charge air exiting the CAC. The ambient humidity measurement and the EGR flow measurement may then be used to estimate the water content of the charge air entering the CAC. A difference between the water content of the air entering the CAC and the water content of the air exiting the CAC may then be indicative of a water accumulation amount or rate within the CAC. A controller may adjust one or more engine actuators in response to water storage at the CAC (e.g., amount of water or rate of water accumulation in the CAC). For example, the controller may adjust vehicle grille shutters, engine cooling fan, and/or an engine coolant pump to reduce CAC cooling efficiency in response to a water storage amount or rate above a threshold. In yet another example, the controller may adjust engine airflow via adjusting a throttle and/or downshifting operations to purge condensate from the CAC in response to the water storage amount increasing above a threshold. In this way, a technical result of determining water storage at the CAC, both while EGR is flowing and when EGR is not flowing, from an oxygen sensor, ambient humidity, and EGR flow may be achieved, thereby reducing CAC condensate formation and increasing combustion stability.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
adjusting engine actuators based on one or more of a water storage amount and water storage rate at a charge air cooler (CAC), the one or more of the water storage amount and water storage rate determined based on an output of an oxygen sensor positioned downstream of the CAC, ambient humidity, and a determined amount of exhaust gas recirculation (EGR) flow.

2. The method of claim 1, wherein the determined amount of EGR flow is a non-zero amount of EGR flow, the determined amount based on an output of an EGR flow sensor positioned in a low-pressure EGR passage positioned between an exhaust passage downstream from a turbine and an intake passage upstream of a compressor while EGR is flowing at a desired EGR flow amount determined based on operating conditions of the engine.

3. The method of claim 2, wherein the EGR flow sensor is a differential pressure over valve (DPOV) sensor and wherein the EGR flow is estimated based on an output of the DPOV sensor, an EGR temperature, and an area of EGR valve opening detected by an EGR valve lift sensor.

4. The method of claim 2, wherein the ambient humidity is measured by a humidity sensor positioned in the intake passage upstream of the CAC and an outlet from the low-pressure EGR passage and into the intake passage.

5. The method of claim 2, wherein the one or more of the water storage amount and water storage rate is based on a difference between a water content of charge air entering the CAC and a water content of the charge air exiting the CAC, the water content of the charge air entering the CAC based on the ambient humidity and the EGR flow while EGR is flowing through the low-pressure EGR passage and the water content of the charge air exiting the CAC based on the output of the oxygen sensor.

6. The method of claim 1, wherein the water storage amount is one of an amount of water stored within the CAC and the water storage rate is a water accumulation rate within the CAC.

7. The method of claim 6, wherein adjusting engine actuators based on the one or more of the water storage amount and water storage rate includes adjusting one or more of vehicle grille shutters, engine cooling fans, or a CAC coolant pump to decrease a cooling efficiency of the CAC in response to the water storage rate increasing above a threshold rate and wherein adjusting engine actuators based on the one or more of the water storage amount and water storage rate includes decreasing an opening of an EGR valve positioned in a low-pressure EGR passage responsive to the water storage rate increasing above the threshold rate.

8. The method of claim 6, wherein adjusting engine actuators based on the one or more of the water storage amount and water storage rate includes increasing engine airflow to purge condensate from the CAC in response to the amount of water stored within the CAC increasing above a threshold amount.

9. The method of claim 1, wherein the oxygen sensor is an intake oxygen sensor positioned at an outlet of the CAC.

10. The method of claim 1, wherein ambient humidity is estimated based on one or more of intake temperature, intake pressure, and a windshield wiper duty cycle.

11. The method of claim 1, wherein ambient humidity is determined based on weather data received from one or more of a weather station, remote device, or in-vehicle entertainment and communications system.

12. An engine method, comprising:
adjusting engine actuators based on a water storage rate at a charge air cooler (CAC), the water storage rate based on an output of an oxygen sensor positioned downstream of the CAC, a humidity measurement, and an exhaust gas recirculation (EGR) flow measurement during a first condition when EGR is flowing and the water storage rate based on the output of the oxygen sensor and the humidity measurement during a second condition when EGR is not flowing.

13. The method of claim 12, wherein the water storage rate is based on a difference between water entering the CAC and water exiting the CAC, the water entering the CAC based on the humidity measurement and the EGR flow measurement and the water exiting the CAC based on the output of the oxygen sensor.

14. The method of claim 12, wherein adjusting engine actuators includes adjusting one or more of spark timing or mass air flow in response to the water storage rate being negative.

15. The method of claim 14, wherein adjusting spark timing includes retarding spark timing when a pedal position is increasing and advancing spark timing when the pedal position is below a threshold position.

16. The method of claim 12, wherein adjusting engine actuators includes adjusting one or more of vehicle grille shutters, engine cooling fans, CAC cooling fans, or a CAC coolant pump to decrease cooling efficiency of the CAC in response to the water storage rate increasing above a threshold rate.

17. The method of claim 12, further comprising estimating a water storage amount based on the water storage rate and wherein adjusting engine actuators includes increasing engine airflow to purge water from the CAC in response to the water storage amount increasing above a threshold amount.

18. The method of claim 12, wherein the EGR flow measurement is one or more of low-pressure or high-pressure EGR where EGR is injected via an EGR outlet into an intake passage upstream of the CAC and wherein the humidity measurement is measured by a humidity sensor positioned upstream of the CAC and upstream of the EGR outlet.

19. An engine system, comprising:
an intake manifold;
a charge air cooler positioned upstream of the intake manifold in an intake passage;
an oxygen sensor positioned at an outlet of the charge air cooler;
a low-pressure exhaust gas recirculation (EGR) passage coupled between an exhaust passage downstream of a turbine and the intake passage upstream of a compressor, the low-pressure EGR passage including a low-pressure EGR valve and low-pressure DPOV sensor for measuring low-pressure EGR flow;
a humidity sensor positioned in the intake passage upstream of the low-pressure EGR passage; and
a controller with computer readable instructions for adjusting engine operation responsive to a water storage rate at the charge air cooler, the water storage rate based on an output of the oxygen sensor, an output of the humidity sensor, and the measured low-pressure EGR flow when low-pressure EGR is flowing.

20. The system of claim 19, further comprising a high-pressure EGR system coupled between the exhaust passage upstream of the turbine and the intake passage downstream of the compressor and upstream of the charge air cooler, the high-pressure EGR system including a high-pressure EGR valve and high-pressure DPOV sensor for measuring high-pressure EGR flow and wherein the water storage rate is further based on the measured high-pressure EGR flow when high-pressure EGR is flowing.

* * * * *